(12) United States Patent
Ueda et al.

(10) Patent No.: US 8,753,060 B2
(45) Date of Patent: Jun. 17, 2014

(54) ARTICLE TRANSFER DEVICE

(71) Applicant: Daifuku Co., Ltd., Osaka (JP)

(72) Inventors: Yuichi Ueda, Hinocho (JP); Masashige Iwata, Hinocho (JP); Tsutomu Okazaki, Kawasaki (JP); Takashi Nishihara, Kawasaki (JP); Kazuhiko Kodera, Kawasaki (JP)

(73) Assignee: Daifuku Co., Ltd., Osaka (JP)

( * ) Notice: Subject to any disclaimer, the term of this patent is extended or adjusted under 35 U.S.C. 154(b) by 0 days.

(21) Appl. No.: 13/778,822

(22) Filed: Feb. 27, 2013

(65) Prior Publication Data
US 2014/0069775 A1    Mar. 13, 2014

(30) Foreign Application Priority Data

Feb. 28, 2012  (JP) ................... 2012-041299

(51) Int. Cl.
*B65G 43/00*    (2006.01)

(52) U.S. Cl.
USPC ........ 414/277; 414/280; 198/346.2; 700/214; 700/218

(58) Field of Classification Search
USPC ........... 414/222.07, 273, 277, 279, 280, 286; 198/346.1, 346.2, 468.3; 700/214, 217, 700/218; 294/119.1, 207
See application file for complete search history.

(56) References Cited

U.S. PATENT DOCUMENTS

| | | | | |
|---|---|---|---|---|
| 5,181,441 A | * | 1/1993 | Okada | 82/1.11 |
| 5,555,178 A | * | 9/1996 | Hashimoto | 700/175 |
| 6,058,337 A | * | 5/2000 | Akiyama et al. | 700/218 |
| 6,333,615 B1 | * | 12/2001 | Maezawa et al. | 318/625 |
| 6,551,049 B2 | * | 4/2003 | Gravell et al. | 414/539 |
| 6,718,229 B1 | * | 4/2004 | Takebayashi et al. | 700/217 |
| 7,686,559 B2 | * | 3/2010 | Tsujimoto et al. | 414/273 |
| 8,162,585 B2 | * | 4/2012 | Tsujimoto et al. | 414/273 |
| 8,348,588 B2 | * | 1/2013 | Yoshida et al. | 414/561 |
| 8,374,420 B2 | * | 2/2013 | Murakami | 382/153 |
| 8,374,719 B2 | * | 2/2013 | Inui | 700/218 |
| 8,382,417 B2 | * | 2/2013 | Yoshida et al. | 414/222.04 |
| 8,448,579 B2 | * | 5/2013 | Inui | 104/288 |
| 8,459,442 B2 | * | 6/2013 | Morimoto et al. | 198/468.6 |
| 8,550,762 B2 | * | 10/2013 | Ueda et al. | 414/281 |

FOREIGN PATENT DOCUMENTS

JP    2011225373 A    11/2011

* cited by examiner

*Primary Examiner* — Douglas Hess
(74) *Attorney, Agent, or Firm* — The Webb Law Firm (57) ABSTRACT

An article transfer device with a simpler structure is provided which can transfer an article to a proper position. Operation of a first projecting and retracting motor is stopped when torque that is greater than or equal to a first preset value occurs in the first projecting and retracting motor when a first article holder is being projected toward a projected position by operation of the first projecting and retracting motor. And operation of a second projecting and retracting motor is stopped when torque that is greater than or equal to a first preset value occurs in the second projecting and retracting motor when a second article holder is being projected toward a projected position by operation of the second projecting and retracting motor.

12 Claims, 10 Drawing Sheets

ARTICLE TRANSFER DEVICE

FIELD OF THE INVENTION

The present invention relates to an article transfer device for transferring an article to a transfer target location.

BACKGROUND

There is an article transfer device, having a pair of article holders which can be projected and retracted along a horizontal projecting and retracting direction, for transferring an article to a transfer target location by projecting the pair of article holders toward a projected position with the article held by the pair of article holders. When performing this operation, the pair of article holders hold both ends of the article, or more specifically, the both ends in a lateral direction that intersects the projecting and retracting direction perpendicularly in a horizontal plane. With respect to how the article is held by article holders, an article is, for example, clamped between the pair of article holders, or is held by an engaging claw which is provided to each of the pair of article holders and which engages corresponding lateral end of the article. JP Publication of Application No. 2011-225373 (Patent Document 1) discloses an article transfer device whose structure is simplified by eliminating the need for an operatively connecting mechanism for operatively connecting the pair of article holders mechanically by providing a pair of motors, namely, a first projecting and retracting motor for projecting and retracting the first article holder of the pair of article holders and a second projecting and retracting motor for projecting and retracting a second article holder of the pair of article holders.

The article transfer device of Patent Document 1 is provided with projected and retracted position detection means for detecting the projected position and retracted position of the first article holder as well as transfer control means for controlling the operation of the pair of projecting and retracting motors. And when the projected and retracted position detection means detects that the first article holder has been moved to a position corresponding to the projected position under the control of the transfer control means, the transfer control means stops the operation of the pair of projecting and retracting motors to stop the pair of article holders at the projected position.

SUMMARY OF THE INVENTION

A processing device for performing a certain process on the article located in the transfer target location may be provided in the back or far side (projecting side) of the transfer target location in the projecting and retracting direction. In such case, the position of the transfer target location needs to be defined with respect to the processing device since it is necessary to properly locate the article with respect to the processing device in a direction along the projecting and retracting direction. When the processing device is displaced in the direction along the projecting and retracting direction due, for example, to error in installing the processing device, etc., it is also necessary to correspondingly displace the transfer target location in the projecting and retracting direction. Therefore, the distance in the projecting and retracting direction by which the article needs to be moved to transfer the article to the transfer target location changes depending on the extent of the displacement of the processing device.

In the article transfer device of Patent Document 1 described above, the projecting movement of the pair of article holders is stopped by projecting the pair of article holders to a predetermined position. Therefore, this article transfer device can only move an article in the projecting and retracting direction by the distance defined in advance. And when the transfer target location is displaced in the projecting and retracting direction as described above, the article transfer device cannot transfer the article to the proper transfer target location that is determined with the displacement taken into consideration.

In light of the current status of the conventional art described above, an article transfer device is desired in which, even when the transfer target location is displaced in the projecting and retracting direction, an article can be transferred properly to a transfer target location thus displaced and in which the structure is simplified.

A characteristic configuration of an article transfer device for transferring an article to a transfer target location in accordance with the present invention is that the article transfer device comprises: a pair of article holders which can be moved along a projecting and retracting direction between a reference position and a projected position in which the pair of article holders are projected toward the transfer target location wherein the pair of article holders are configured to be projected toward the projected position to transfer an article to the transfer target location with the pair of article holders holding both ends of the article in a lateral direction which is defined to be a direction that perpendicularly intersects the projecting and retracting direction in plain view in which the article transfer device is seen from above; a pair of projecting and retracting motors which consist of a first projecting and retracting motor for projecting and retracting a first article holder of the pair of article holders, and a second projecting and retracting motor for projecting and retracting a second article holder of the pair of article holders; a transfer controller which controls operations of the pair of projecting and retracting motors; wherein the transfer controller is configured to control operations of the pair of projecting and retracting motors to stop operation of the first projecting and retracting motor when torque that is greater than or equal to a first preset value occurs in the first projecting and retracting motor due to the article coming into contact with a positioning contact member provided in association with the transfer target location when the first article holder is being projected toward the projected position by operation of the first projecting and retracting motor, and to stop operation of the second projecting and retracting motor when torque that is greater than or equal to a second preset value occurs in the second projecting and retracting motor due to the article coming into contact with the positioning contact member when the second article holder is being projected toward the projected position by operation of the second projecting and retracting motor.

With the arrangement described above, by providing a pair of projecting and retracting motors, it becomes unnecessary to provide an operatively connecting mechanism for operatively connecting the pair of article holders, which leads to simplification of the article transfer device. And operation of the first projecting and retracting motor is stopped if torque that is greater than the first preset value occurs in the first projecting and retracting motor due to the article coming into contact with the positioning contact member. And similarly, operation of the second projecting and retracting motor is stopped if torque that is greater than the second preset value occurs in the second projecting and retracting motor. In other words, the article transfer device is configured to transfer an article to the transfer target location of a storage section by projecting the pair of article holders toward the projected position so that the article is pressed against the positioning contact member.

For example, in a facility where a transfer target location is defined in association with a processing device, the positional relationship between the processing device and its transfer target location may become improper in the projecting and retracting direction if the position of the processing device is displaced in the projecting and retracting direction due to an installation error. With the characteristic configuration of the present invention, even when this happens, the positioning contact member provided to the processing device is similarly displaced with the processing device. Therefore, the article transfer device can maintain the proper positional relationship between the processing device and the transfer target location in the projecting and retracting direction by transferring the article so that the article comes into contact with the positioning contact member. In other words, the article transfer device can transfer an article to the transfer target location that is displaced by the amount that corresponds to the amount of displacement of the position of the processing device. Thus, with this characteristic configuration, its structure is simplified by projecting and retracting the pair of article holders with the pair of projecting and retracting motors. And even if the transfer target location is displaced in the projecting and retracting direction, the article can be properly transferred to the displaced article transfer location.

Examples of preferred embodiments of the present invention are described next. In one embodiment of an article transfer device in accordance with the present invention, a transfer projection amount for the pair of article holders from the reference position to the projected position is preferably set to be an amount of projection that is greater by a set amount than a required projection amount from the reference position that is required to move the article to the transfer target location, and wherein the transfer controller is preferably configured to determine that the article has not been transferred properly to the transfer target location if either a difference between the amount of projection of the first article holder from the reference position and the transfer projection amount when operation of the first projecting and retracting motor is stopped because torque that is greater than or equal to the first preset value has occurred, or a difference between the amount of projection of the second article holder from the reference position and the transfer projection amount when operation of the second projecting and retracting motor is stopped because torque that is greater than or equal to the second preset value has occurred, is greater than a permissible amount that is greater than the set amount.

Since the transfer projection amount is set to be an amount of projection that is greater than the required projection amount by the set amount, the article comes into contact with the positioning contact member before the pair of article holders reach the projected position when projecting the pair of article holders from the reference position toward the projected position to transfer an article to the transfer target location. In other words, before the pair of article holders are projected from the reference position by the transfer projection amount, the article comes into contact with the positioning contact member and the operations of the pair of projecting and retracting motors are stopped when the article holders are projected by the required projection amount which is less than the transfer projection amount by the set amount.

On the other hand, if the article comes into contact with a foreign object which is not the positioning contact member when projecting the pair of article holders to the projected position, torque greater than a set torque occurs in each of the pair of projecting and retracting motors before, for example, the article is transferred to the transfer target location. In such case, the pair of article holders may be caused to end their projecting movement and to stop after moving by an amount of projection that is less than the required projection amount. When this happens, the amount of projection of the pair of article holders from the reference position is less than the required projection amount and is less than the transfer projection amount by a value greater than or equal to the set amount. In other words, the difference between the actual projection amount of the pair of article holders from the reference position and the transfer projection amount is greater than the set amount. Accordingly, when this happens, the transfer controller can determine that the article has not been transferred properly to the transfer target location if either the difference between the amount of projection of the first article holder from the reference position and the transfer projection amount when the operation of the first projecting and retracting motor is stopped, or the difference between the amount of projection of the second article holder from the reference position and the transfer projection amount when the operation of the second projecting and retracting motor is stopped is greater than the permissible amount which is greater than the set amount. And by making this determination, the transfer controller can respond appropriately to the improper transfer by, for example, controlling operation of a warning device to issue an alarm that the article has not been transferred properly to the transfer target location, and/or by, for example, not allowing a processing device to start operating if the processing device is provided for performing a processes on an article in a storage section.

In one embodiment of an article transfer device in accordance with the present invention, the article transfer device preferably further comprises: a movement restricting member whose position can be changed between a retracted position in which the movement restricting member is retracted from a travel path of the article when the article is being transferred to the transfer target location and a restricting position in which the movement restricting member is projected into the travel path at a location closer toward a retracting side, along the projecting and retracting direction, with respect to the article in the transfer target location in order to restrict movement of the article in the transfer target location toward the retracting side; and a restricting position detecting device for detecting a position of the movement restricting member; wherein the transfer controller is preferably configured to determine, based on detected information from the restricting position detecting device, that the article has not been transferred properly to the transfer target location if the movement restricting member is not in the restricting position when operation of the first projecting and retracting motor is stopped because torque that is greater than or equal to the first preset value has occurred and operation of the second projecting and retracting motor is stopped because torque that is greater than or equal to the second preset value has occurred.

That is, since the movement restricting member is provided, any movement of the article located in the transfer target location toward the retracting side is restricted by the movement restricting member when deployed. In other words, any displacement of the article located in the transfer target location toward the retracting side can be prevented by the movement restricting member. On the other hand, if the article is located toward the retracting side with respect to the transfer target location, the position of the movement restricting member cannot be changed from the retracted position to the restricting position because of the presence of the article. Therefore, if the movement restricting member is not located in the restricting position, the article may not have been properly transferred to the transfer target location. Thus, the transfer controller can determine that the article has not been transferred properly to the transfer target location if the movement restricting member is not located in the restricting position when the operations of the first projecting and retracting motor and the second projecting and retracting motor are stopped.

In one embodiment of an article transfer device in accordance with the present invention, when the movement restricting member is provided, the article transfer device preferably further comprises a restricting member operating member which can be moved along the projecting and retracting direction and which is configured to move the movement restricting member from the restricting position to the retracted position when the restricting member operating member is projected.

The restricting member operating member needs to be provided only to the article transfer device. And even if two or more transfer target locations are provided, there is no need to provide the restricting member operating member to each of the plurality of transfer target locations. Since the number of restricting member operating members can be reduced, the structure of the rack etc. to which the transfer target location is defined can be simplified.

In one embodiment of an article transfer device in accordance with the present invention, the pair of article holders preferably include engaging claws which engage respective sides of the article laterally inwardly toward the respective sides of the article.

Displacement of the article in the lateral direction can be restricted by the article holders with each of the pair of article holders engaging corresponding lateral side of the article laterally inwardly. Furthermore, it is difficult for the article to be displaced with respect to the article holders in the projecting and retracting direction during the transfer operation since the article is transferred to the transfer target location with the article engaged by the engaging claws which restricts any displacement. Thus, an article can be transferred properly.

DETAILED DESCRIPTION

An example in which an article transfer device in accordance with the present invention is applied to an article storage facility is described next with reference to the drawings.

Figure 1:
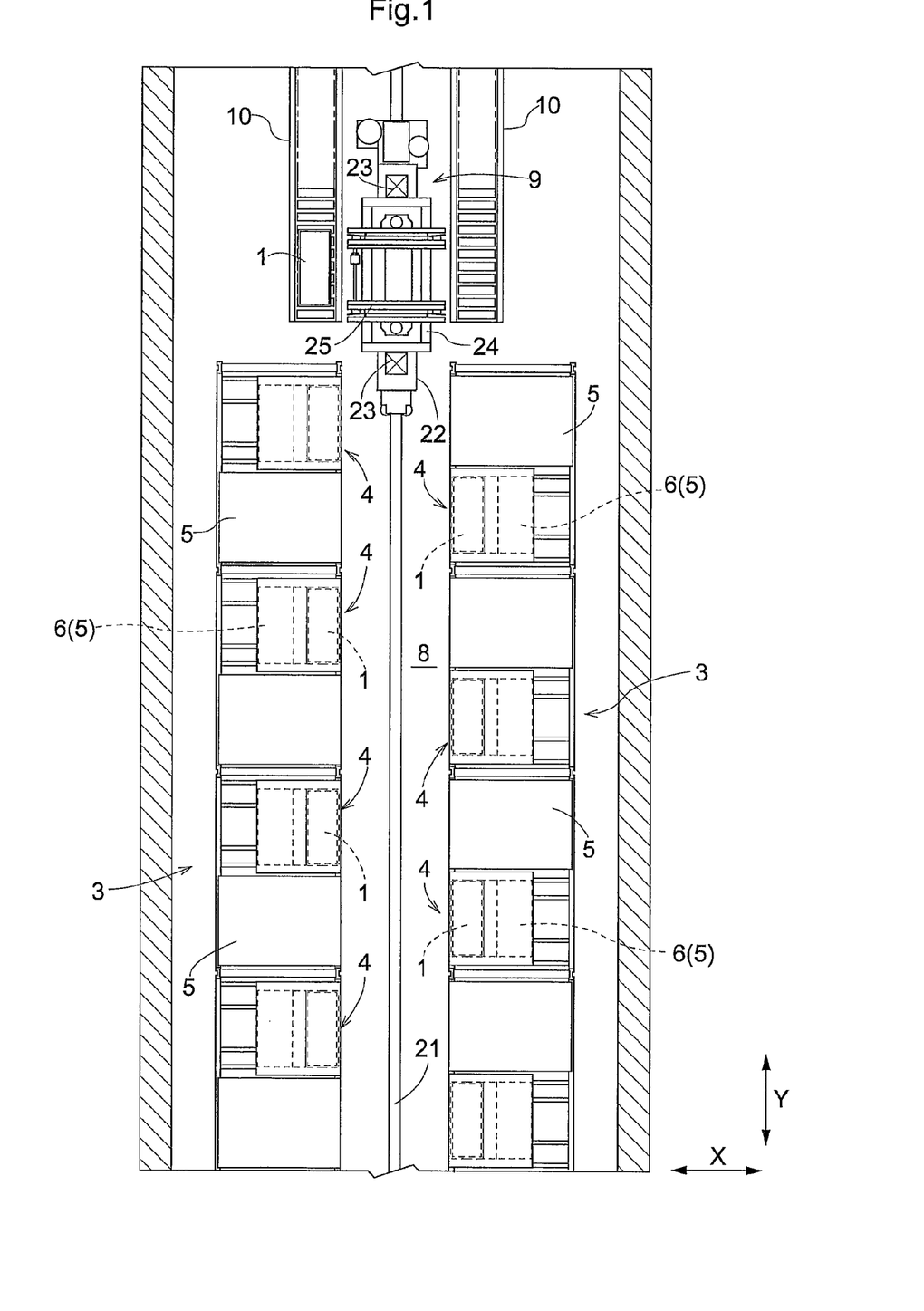
FIG. 1 is a plan view of an article storage facility.
Figure 3:
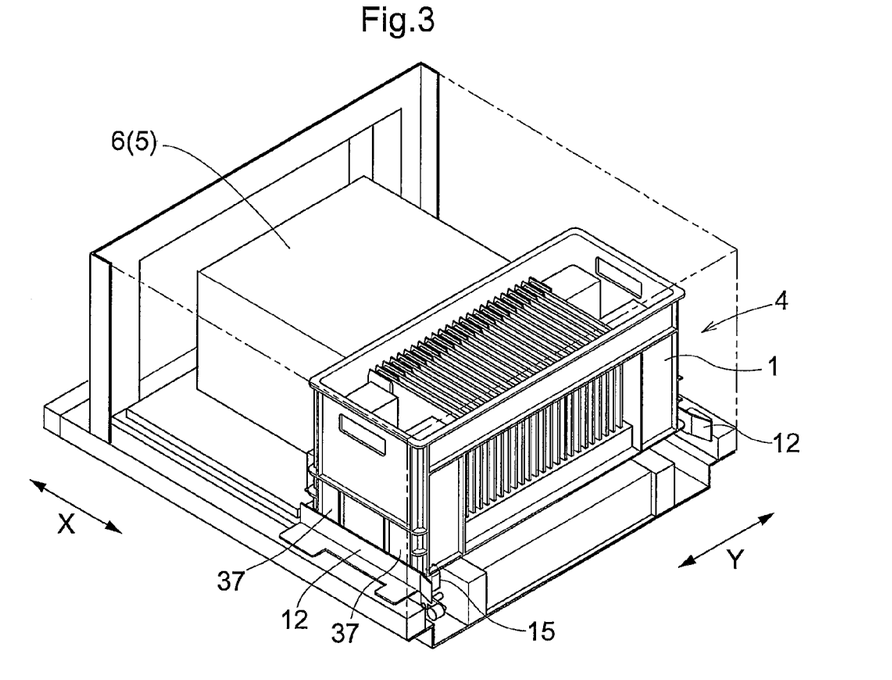
FIG. 3 is a perspective view of a storage section in which an article is stored.

FIG. 1 is a plan view of an article storage facility as seen from above. As shown in FIG. 1, articles 1 are stored in storage sections 4 in racks 3 of the article storage facility. Processing devices 5 which perform predetermined process on the articles 1 are provided in the racks 3. The process is performed on an article 1 stored in a given storage section 4 while the article 1 is connected to a connection mechanism 6 of the processing device 5. As shown in FIG. 3, in the present embodiment, each article 1 is a container for holding or carrying a plurality of plate-shaped rechargeable batteries arranged in a horizontal row. And the processing device 5 is a charging apparatus which charges the rechargeable batteries in the article 1.

As shown in FIG. 1, the article storage facility includes, in addition to the racks 3, a stacker crane 9 which functions as a transport device that travels in travel space 8 defined in front of the racks 3 to transport the articles 1 one at a time. The stacker crane 9 transports articles 1 transported to an input and output location by an input and output conveyor 10 to a storage section 4, and transports articles 1 stored in the storage sections 4 to the input and output location of the other input and output conveyor 10. Each rack 3 includes a plurality of the storage sections 4 arranged in vertical columns and horizontal rows. A pair of racks 3 are provided in the article storage facility such that the racks 3 face each other with a gap defined between them. The travel space 8 in which the stacker crane 9 travels is formed or defined in the gap between the pair of racks 3 that face each other. Note that the input and output location of the input and output conveyor 10 and the location in a given storage section 4 to which the article 1 is transferred (see FIG. 2) are the transfer target locations E. In addition, the transfer target location E of each storage section 4 is set as the proper position for the connection mechanism 6 of the processing device 5.

[Storage Section]

Figure 2:
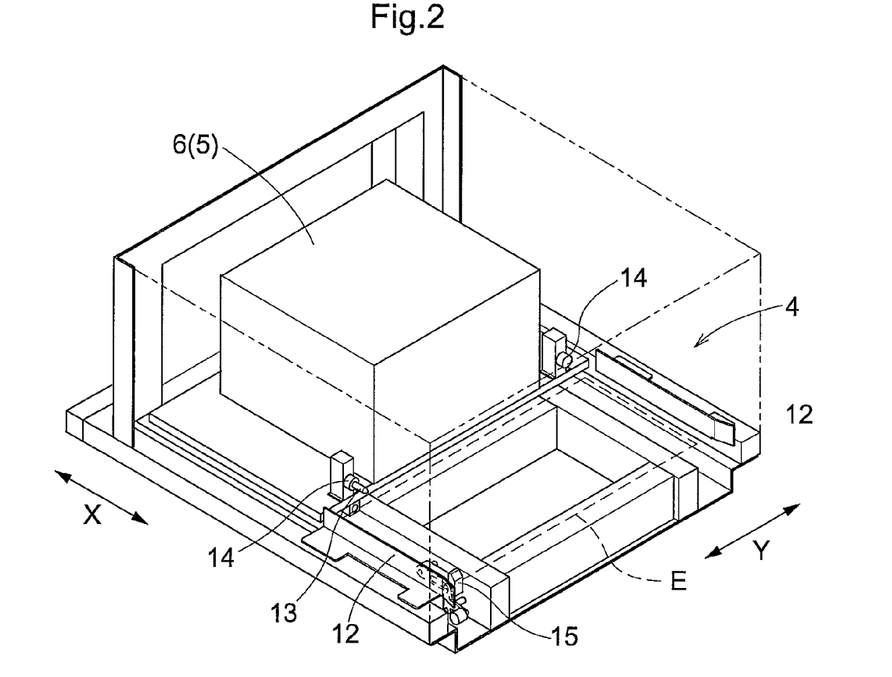
FIG. 2 is a perspective view of a storage section in which no article is stored.

As shown in FIGS. 2 and 3, each storage section 4 is provided with guide rails 12 which come into contact with respective lateral side faces (side faces in the lateral direction Y) of an article 1 to guide the article 1 in the fore and aft direction (i.e., direction along the projecting and retracting direction X), a guiding pin 13 which guides the article 1 in the fore and aft direction by being inserted into an insertion hole 11 (see FIGS. 4A-4C, 5A, and 5B) formed in the article 1, positioning contact members 14 which properly position the article 1 in the transfer target location E by contacting the article 1 located in the transfer target location E from the back side of the storage section 4, and a movement restricting member 15 which restricts movement of the article 1 in the transfer target location E toward the front side (i.e., travel path side). Note that the positioning contact members 14 are provided to the connection mechanism 6 of the processing device 5.

The movement restricting member 15 is configured such that its position can be changed between a retracted position (see FIGS. 4B and 5B) in which the movement restricting member 15 is retracted downwardly and away from the path of movement of the article 1 when the article 1 is being transferred to the transfer target location E, and a restricting position (see FIGS. 4A, 4C, and 5A) in which the movement restricting member 15 is projected into the path of movement of the article 1 to restrict movement of the article 1 in the transfer target location E toward the front side. The movement restricting member 15 is provided with a spring 16 which functions as urging means for urging the movement restricting member 15 toward the restricting position. The movement restricting member 15 is pulled and urged by the spring 16 and thus held in the restricting position.

Figure 4A:
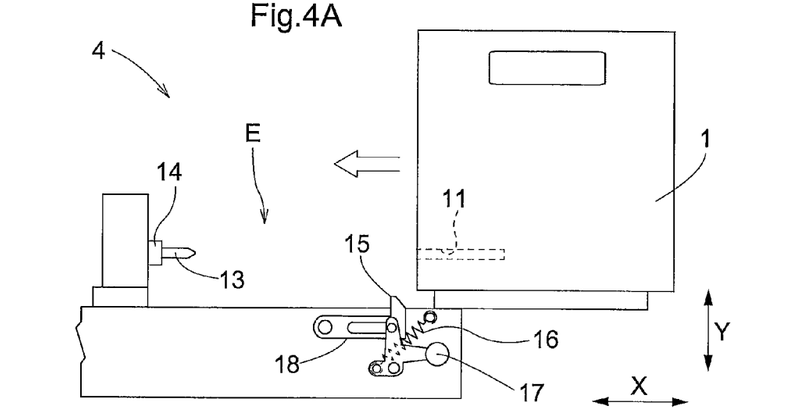
FIG. 4A-FIG. 4C show how an article is transferred and how a movement restricting member operates.
Figure 4B:
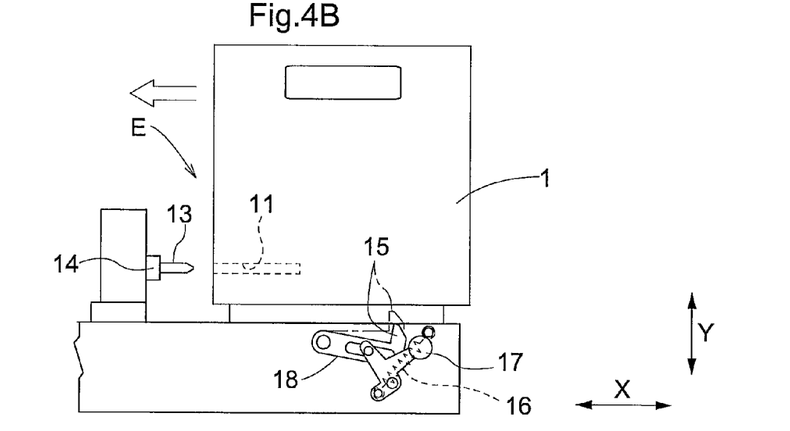
Figure 4C:
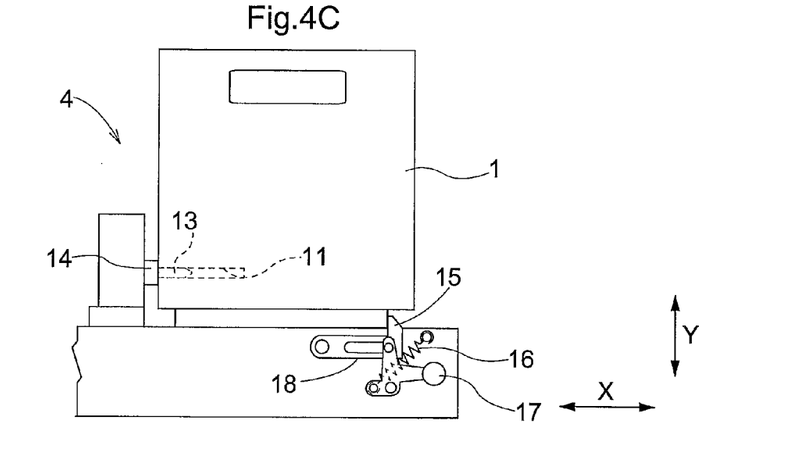

The operation of the movement restricting member 15 when transferring an article 1 from the article transfer device 25 to the transfer target location E of a storage section 4 is described next. As shown in FIGS. 4A and 4B, the movement restricting member 15 is moved to its retracted position when it is contacted by the article 1 which is being moved toward the transfer target location E and is pressed downwardly against the urging force of the spring 16. And as shown in FIG. 4C, the movement restricting member 15 is moved to its restricting position by the urging force of the spring 16 when the article 1 reaches the transfer target location E and releases its pressing force on the movement restricting member 15. The movement restricting member 15 in this restricting position is located closer to the front side (the front face side of the storage section 4 of the rack 3, or the travel space 8 side) with respect to the article 1 in the transfer target location E. The article 1 is restricted from moving toward the front side from the transfer target location E by virtue of the fact that the article 1 is in contact with the movement restricting member 15.

In addition, the movement restricting member 15 is configured to be moved to the retracted position from the restricting position also by operating an operating member 17. This operating member 17 is operatively connected to the movement restricting member 15 by a linkage mechanism 18 such that the movement restricting member 15 is depressed to the retracted position by the movement of the operating member 17 toward the back side (back side of the storage section 4 of the rack 3 or the side opposite from the front side). The article transfer device 25 is provided with a restricting member operating member 30 which can be moved along the fore and aft direction (projecting and retracting direction X) of the rack 3. And the operating member 17 is operated and moved to the back side by the restricting member operating member 30 when the restricting member operating member 30 is projected. This causes the movement restricting member 15 to be moved from the restricting position to the retracted position against the urging force of the spring 16. And by moving the movement restricting member 15 to the retracted position in this manner, the article 1 can be transferred from the transfer target location E of the storage section 4 to the article transfer device 25 by the article transfer device 25 (see FIGS. 5A and 5B).

[Stacker Crane]

As shown in FIG. 1, the stacker crane 9 includes a traveling carriage 22 which can travel along a travel rail 21, a vertically movable platform 24 which can move vertically along support columns 23 arranged vertically on the traveling carriage 22, and an article transfer device 25 mounted on the vertically movable platform 24. And the stacker crane 9 is configured to transport an article 1 in the input and output location of the input and output conveyor 10 to a storage section 4 and to transport an article 1 in a storage section 4 to the input and output location of the other input and output conveyor 10 through travel operation of the traveling carriage 22, vertical movement of the vertically movable platform 24, and transfer operation of the article transfer device 25.

Figure 6A:
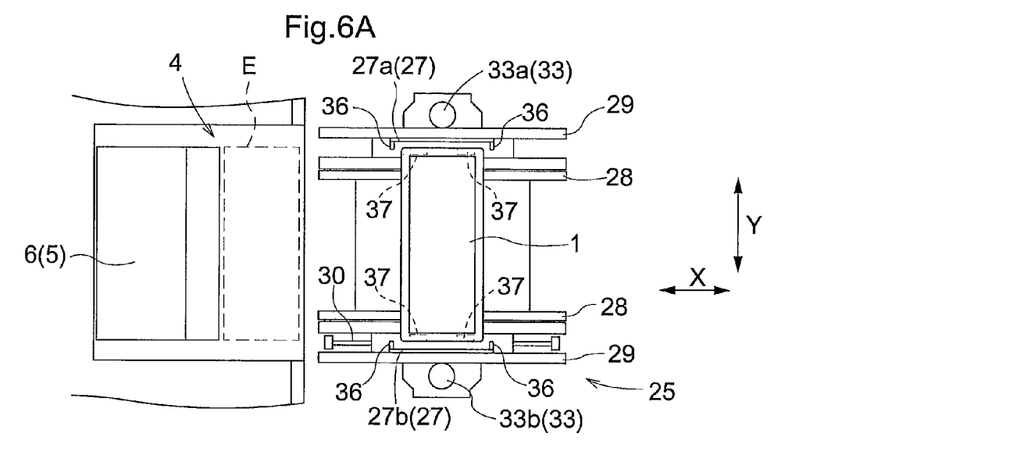
FIG. 6A-FIG. 6F show how an article transfer device performs a transfer operation.

The article transfer device 25 includes a pair of article holders 27 which can be moved along the projecting and retracting direction X between a reference position (see FIGS. 6B and 6C) and a projected position (see FIGS. 6D and 6E) in which the article holders 27 are projected toward the transfer target location E. The article transfer device 25 transfers an article 1 to the transfer target location E by projecting the pair of article holders 27 to the projected position with both ends of the article 1 in the lateral direction Y held by the pair of article holders 27. Similarly, the article transfer device 25 transfers an article 1 to the article transfer device 25 by retracting the pair of article holders 27 to the retracted position with the lateral ends of the article 1 held by the pair of article holders 27. Note that the fore and aft direction of the rack 3 is identical to the projecting and retracting direction X of the pair of article holders 27 and thus that the back side and a projecting side are the same side whereas a proximate side and retrieving side are the same side. The pair of article holders 27 are configured to be projected to both sides along the projecting and retracting direction. Thus, the article transfer device 25 is configured to be able to transfer an article 1 to the rack 3 on the right side of the travel space 8 and to the rack 3 on the left side, and also to the input and output location of the input and output conveyor 10 on the right side of the travel space 8 and to the input and output location of the input and output conveyor 10 on the left side. Note that the position of the pair of article holders 27 in FIGS. 6A and 6F is their stand-by position, which is defined as their position for when the traveling carriage 22 is traveling and when the vertically movable platform 24 is being vertically moved.

The article transfer device 25 is further described next in which the direction (lateral direction of the rack 3, and the travel direction of the traveling carriage 22) that perpendicularly intersects the projecting and retracting direction of the pair of article holders 27 (fore and aft direction of the rack 3) in plain view is referred to as the lateral direction Y. As shown in FIGS. 6A-6F, the article transfer device 25 includes a pair of transport conveyers 28 which support and transport an article 1 along the projecting and retracting direction, a pair of movable members 29 with one movable member 29 located to one side of the pair of transport conveyers 28 and the other movable member 29 located to the other side of the pair of transport conveyers 28 and with the movable members 29 being configured to be moved closer to each other and farther apart from each other, the pair of article holders 27 which are supported by respective movable members 27 such that the article holders 27 can be projected and retracted along the projecting and retracting direction, and the restricting member operating member 30 which moves the movement restricting member 15 from the restricting position to the retracted position.

The pair of transport conveyers 28 are arranged such that they are spaced apart from each other in the lateral direction Y and parallel to each other. The article 1 to be supported and transported is received and supported on and by both transport conveyers 28. Circulating belts of the of transport conveyers 28 are driven and circulated by actuation of a single conveyor motor 31 (see FIG. 8) in a forward direction and its opposite direction. The article 1 received and supported by the pair of transport conveyers 28 is supported and transported along the projecting and retracting direction X. Note that each of the transport conveyers 28 is a belt conveyor.

The movable members 29 are so provided that they are located outwardly of the pair of transport conveyers 28 in the lateral direction Y and that they are spaced apart from each other by a distance larger than the lateral width of the article 1. The movable members 29 are moved in opposite directions from each other along the lateral direction Y by actuation of a single distance changing motor 32 (see FIG. 8) in a forward direction and its opposite direction. This arrangement allows the two movable members 29 to change the distance between them through a distance changing movement which widens or narrows the distance between them. The two article holders 27 are supported by respective movable members 29. Therefore, the two article holders 27 are moved closer to each other and farther apart from each other (i.e. the distance between them in the lateral direction Y is adjusted) by moving the two movable members 29 closer to each other and farther apart from each other.

Each of the two article holders 27 is supported by associated one of the two movable members 29 such that the article holders 27 can be moved along the projecting and retracting direction X. The pair of article holders 27 are moved along the projecting and retracting direction X with respect to the movable members 29 to be moved between the reference position and the projected position by actuation of projecting and retracting motors 33 in a forward direction and its opposite direction. Incidentally, the two article holders 27 have engaging claws 36 which engage respective lateral ends of the article 1 laterally inwardly (i.e., from outer side in the lateral direction Y). More specifically, an engaged portion 37 which the engaging claw 36 engages is formed or defined at a lower end location in a front end portion as well as at a lower end location in a back end portion, of each lateral side face of the article 1. The engaging claws 36 of the article holder 27 are so formed to engage the engaged portions 37 of the article 1.

The engaged portions 37 are formed in both lateral side faces of the article 1. The pair of article holders 27 are configured to hold both ends of the article 1 in the lateral direction Y by causing the engaging claws 36 to engage the engaged portions 37 of the article 1 laterally inwardly (i.e., from outer side in the lateral direction Y). The pair of article holders 27 are configured to move to holding position in which the engaging claws 36 engage the engaged portions 37 of the article 1 as show in FIGS. 6C and 6D, by causing the article holders 27 to move closer to each other. In addition, the pair of article holders 27 are configured to move to holding releasing position in which the engaging claws 36 disengage the engaged portions 37 of the article 1 as shown in FIGS. 6A, 6B, 6E, and 6F, by causing the holders 27 to move away from each other. Note that each article holder 27 has an engaging claw 36 that is used when transferring an article 1 to and from one of the racks 3 (for example, left-hand side rack 3 in FIG. 1) that is located to one side of the travel space 8, as well as an engaging claw 36 that is used when transferring an article 1 to or from the other of the racks 3 (for example, right-hand side rack 3 in FIG. 1) that is located to the other side of the travel space 8. In addition, each article 1 has engaged portions 37 that are used when transferring the article 1 to and from one of the racks 3 that is located to one side of the travel space 8, as well as engaged portions 37 that are used when transferring the article 1 to or from the other of the racks 3 that is located to the other side of the travel space 8.

Figure 7:
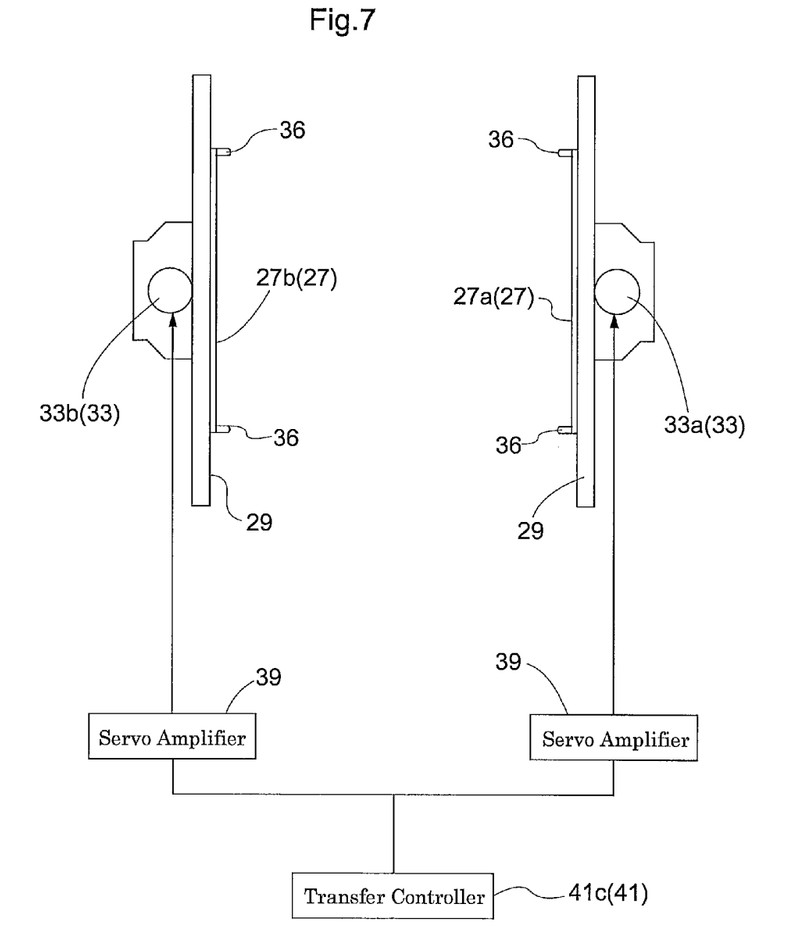
FIG. 7 is a control block diagram for a projecting and retracting operation of the article transfer device.

As shown in FIG. 7, a first projecting and retracting motor 33a and a second projecting and retracting motor 33b are provided as the projecting and retracting motors 33 for projecting and retracting the article holders 27. The first projecting and retracting motor 33a is the motor that projects and retracts the first article holder 27a of the pair of article holders 27. The second projecting and retracting motor 33b is the motor that projects and retracts the second article holder 27b in the pair of article holders 27. Each of the first projecting and retracting motor 33a and the second projecting and retracting motor 33b is a servo-motor and is powered by electric power supply from a servo amplifier 39. In addition, each projecting and retracting motor 33a, 33b is configured to transmit to its servo amplifier 39 pulse signals (position information) from an encoder installed within the servo-motor and torque information which is obtained based on the amount of current applied to the projecting and retracting motor 33a, 33b. The transfer controller 41c determines the positions of the first article holder 27a and the second article holder 27b along the projecting and retracting direction as well as the torque which has occurred in the first projecting and retracting motor 33a and the second projecting and retracting motor 33b, based on the pulse signals and torque information.

As shown in FIGS. 5A, 5B, and 6A-6F, the restricting member operating member 30 is configured to be projected and retracted along the projecting and retracting direction X by actuation of the release motor 34 (see FIG. 8) in the forward direction and its opposite direction. And the restricting member operating member 30 is configured to be able to project toward the transfer target location E to push the operating member 17 and thus to move the movement restricting member 15 from the restricting position to the releasing position. And the pushing force on the operating member 17 is released by retracting the restricting member operating member 30 to the retracting side. And the movement restricting member 15 is returned to the restricting position by the urging force of the spring 16.

Figure 5A:
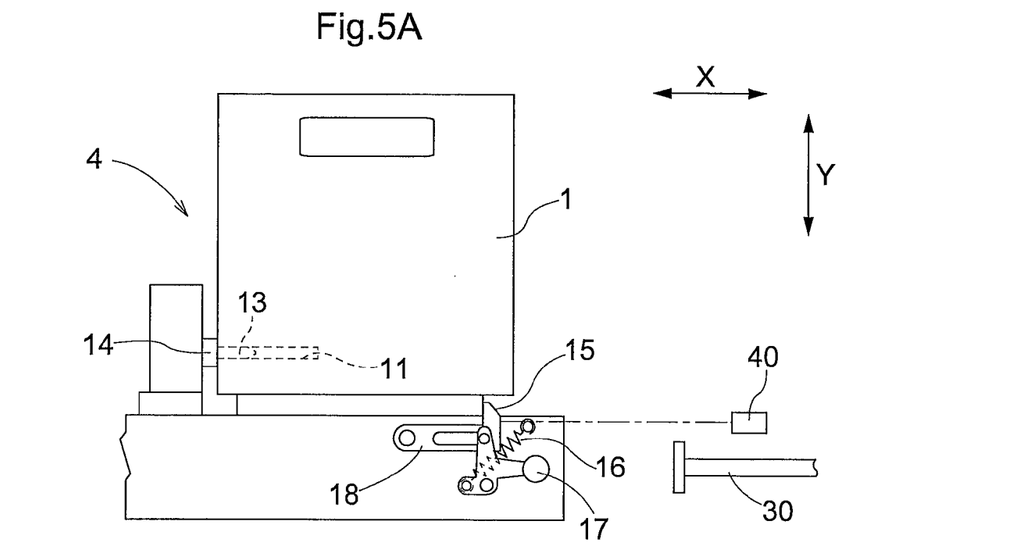
FIG. 5A and FIG. 5B show how a restricting member operating member operates.
Figure 5B:
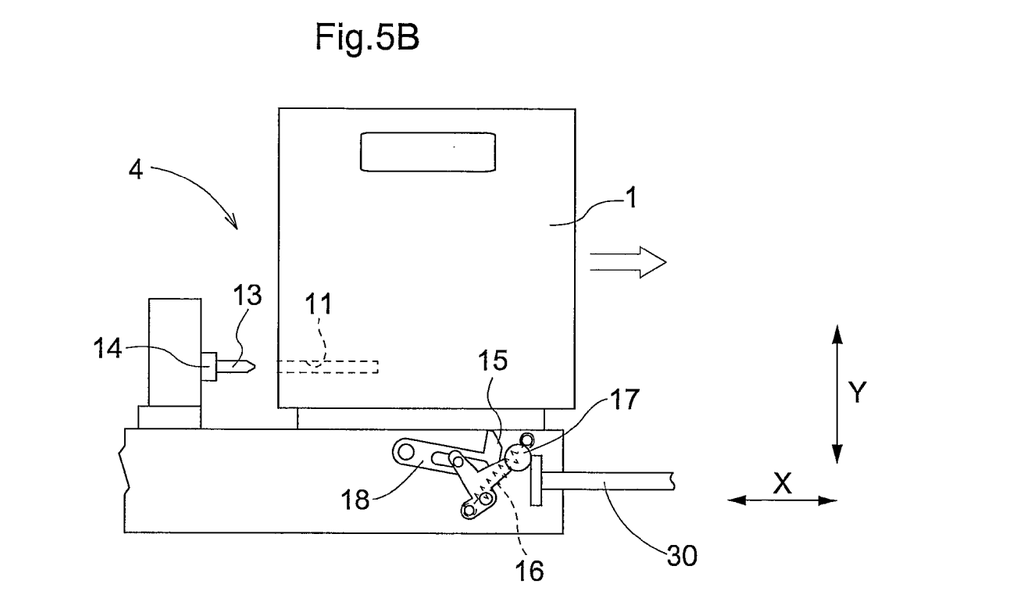
Figure 8:
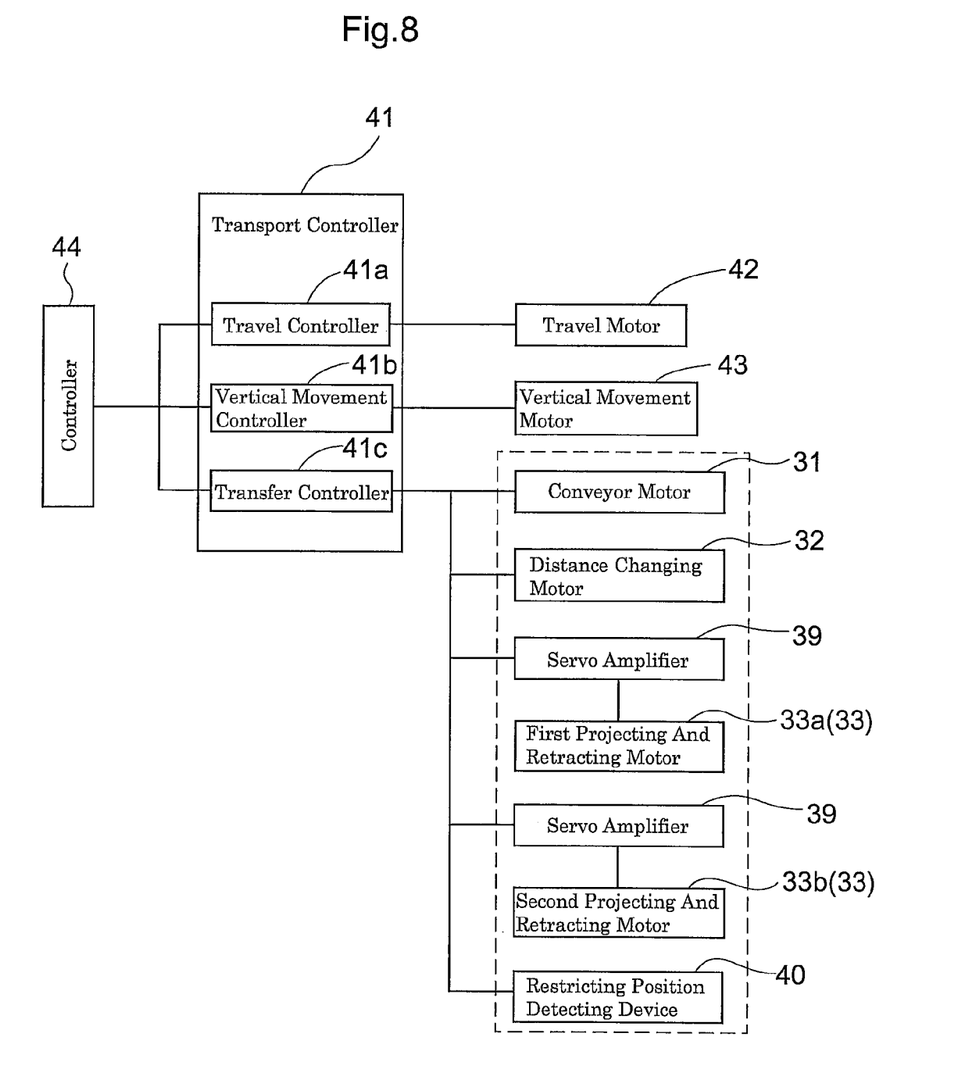
FIG. 8 is a control block diagram.

As shown in FIGS. 5A, 5B, and 8, a restricting position detecting device 40 which detects the position of the movement restricting member 15 is provided in the article transfer device 25. This restricting position detecting device 40 includes a sensor that emits light and receives the reflected light. The detection light emitted from the restricting position detecting device 40 is reflected by the movement restricting member 15 when the movement restricting member 15 is in the restricting position. And the restricting position detecting device 40 receives the reflected light. Thus, the restricting position detecting device 40 detects or determines that the movement restricting member 15 is in the restricting position when it receives the reflected light.

[Controller]

The article storage facility includes the transport controller 41 which controls the operation of the stacker crane 9. This transport controller 41 includes a travel controller 41a which controls operation of the travel motor 42 which causes the traveling carriage 22 to travel, a vertical movement controller 41b which controls operation of the vertical movement motor 43 which causes the vertically movable platform 24 to be moved vertically, and a transfer controller 41c which controls operations of various motors provided to the article transfer device 25. The transport controller 41 is configured to control operation of the stacker crane 9 based on transport commands from a superordinate controller 44 to transport articles 1 brought to the input and output location of the input and output conveyor 10 to storage sections 4, and also to transport articles 1 stored in the storage sections 4 to the input and output location of the other input and output conveyor 10.

The transfer controller 41c is configured to transfer an article 1 from the article transfer device 25 to the transfer target location E or to transfer an article 1 from the transfer target location E to the article transfer device 25 by controlling operations of the conveyor motor 31, distance changing motor 32, the pair of projecting and retracting motors 33, and the release motor 34. Control process of the transfer controller 41c when transferring an article 1 from a location on the article transfer device 25 to the transfer target location E is described first. When transferring an article 1 from a location on the article transfer device 25 to the transfer target location E, the article 1 is located on the article transfer device 25 before the transfer, as shown in FIG. 6A. And the pair of article holders 27 are in the stand-by position in the projecting and retracting direction X and in the holding releasing position in the lateral direction Y. In addition, as shown in FIG. 4A, the movement restricting member 15 is in the restricting position.

Figure 6B:
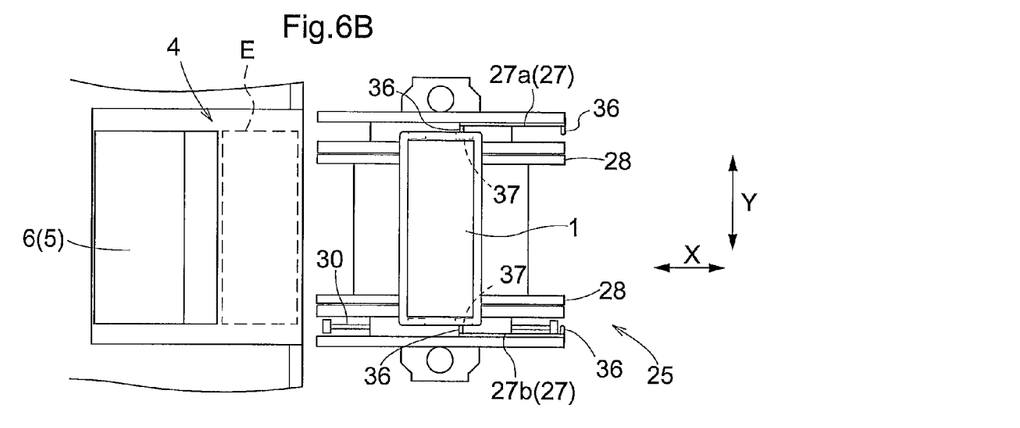
Figure 6C:
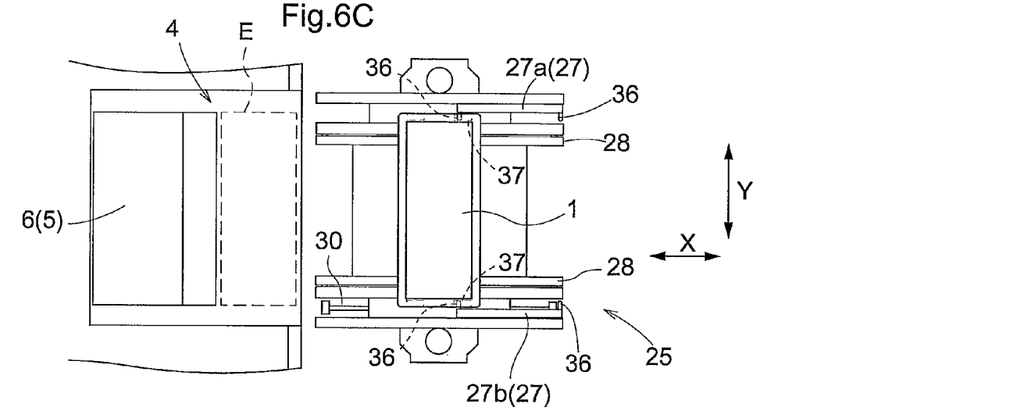
Figure 6D:
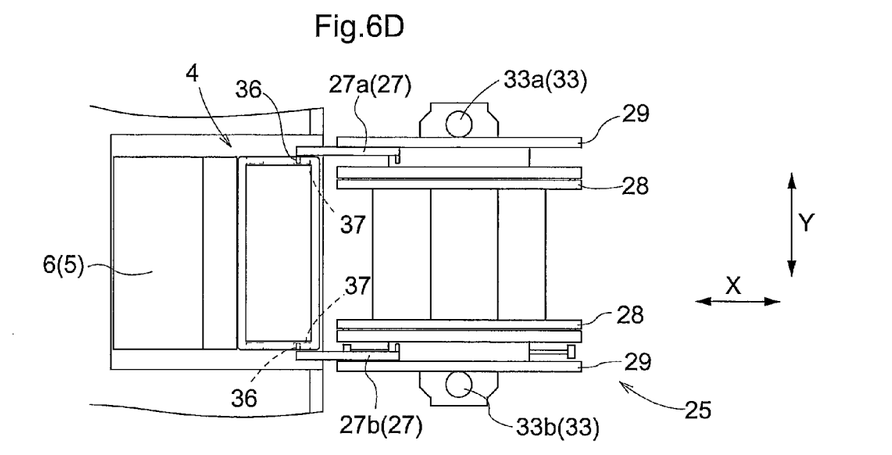

In this state, as shown in FIG. 6B, the transfer controller 41c controls operations of the pair of projecting and retracting motors 33 to move the pair of article holders 27 to the reference position to cause the positions of the engaging claws 36 to be in alignment with the positions of the respective engaged portions 37 of the article 1 along the projecting and retracting direction X. Next, as shown in FIG. 6C, the transfer controller 41c controls operation of the distance changing motor 32 to move the pair of article holders 27 to the holding position by moving the article holders 27 closer together and to cause the engaging claws 36 to engage the engaged portions 37 of the article 1. And as shown in FIG. 6D, the transfer controller 41c controls operation of the projecting and retracting motor 33 to project the pair of article holders 27 from the reference position toward the projected position in order to transfer the article 1 to the transfer target location E. During this operation, the transfer controller 41c synchronizes the operation of the conveyor motor 31 with the operations of the projecting and retracting motors 33 so that the article 1 is transferred by the article holders 27 and the transport conveyers 28 operating together.

Figure 6E:
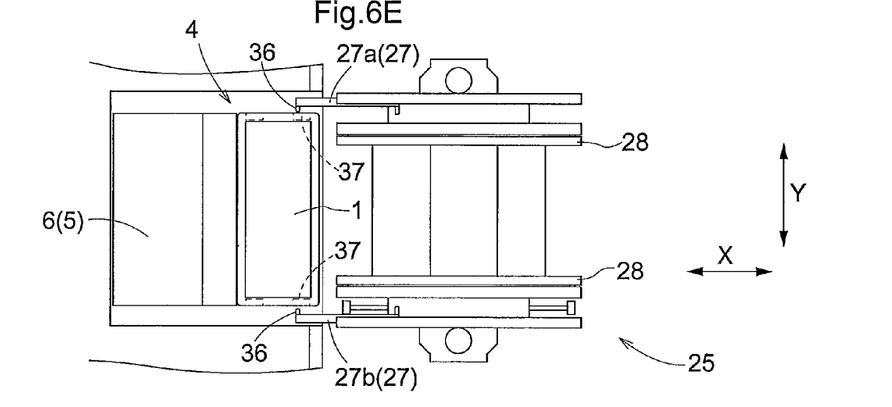
Figure 6F:
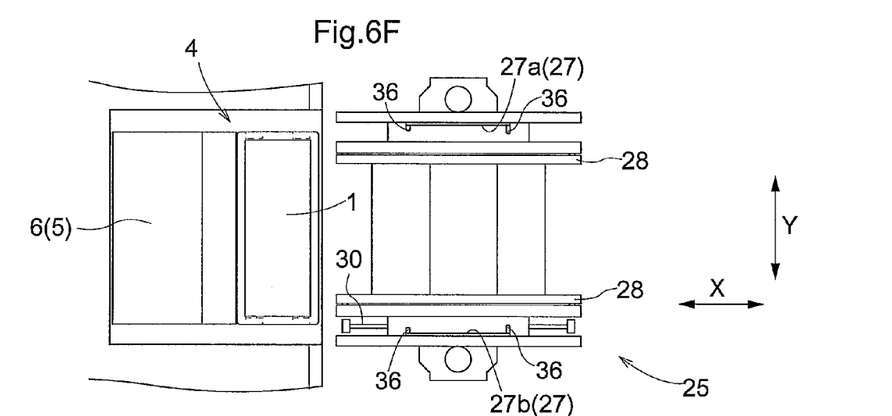

As shown in FIGS. 4A-4C, the movement restricting member 15 remains depressed to the retracted position by the article 1 during this transfer of the article 1. And the movement restricting member 15 returns to the restricting position when the transfer of the article 1 is completed. As shown in FIG. 6E, after the article 1 has been transferred to the transfer target location E, the transfer controller 41c controls operation of the distance changing motor 32 to move the pair of article holders 27 away from each other to move them to the holding releasing position and to cause the engaging claws 36 to disengage from the engaged portions 37 of the article 1. Subsequently, as shown in FIG. 6F, the transfer controller 41c controls operations of the projecting and retracting motors 33 to retract the pair of article holders 27 to the stand-by position.

The control operation of the transfer controller 41c when transferring an article 1 from the transfer target location E onto the article transfer device 25 is performed by reversing the procedure for transferring an article 1 from a location on the article transfer device 25 to the transfer target location E; thus, detailed description is omitted. Note that moving the restricting member operating member 30 to the retracted position in this case is different from the case where an article 1 is being transferred from a location on the article transfer device 25 to the transfer target location E. In other words, the transfer controller 41c operates the release motor 34 before moving the pair of article holders 27 to the reference position to transfer the article 1 onto the article transfer device 25. More specifically, as shown in FIGS. 5A and 5B, the transfer controller 41c controls operation of the release motor 34 to project the restricting member operating member 30 in order to depress the movement restricting member 15 to the retracted position.

Next, the control operation by the transfer controller 41c, when controlling the operation of the projecting and retracting motor 33 to transfer the article 1 to the transfer target location E when transferring an article 1 from a location on the article transfer device 25 to the transfer target location E, is described with reference to the flow chart in FIG. 10. Stored in the transfer controller 41c in advance are a first preset value that is a torque value used as the criterion for stopping the operation of the first projecting and retracting motor 33a, and a second preset value that is a torque value used as the criterion for stopping the operation of the second projecting and retracting motor 33b. In present embodiment, the first preset value and the second preset value are set to the same value.

Figure 10:
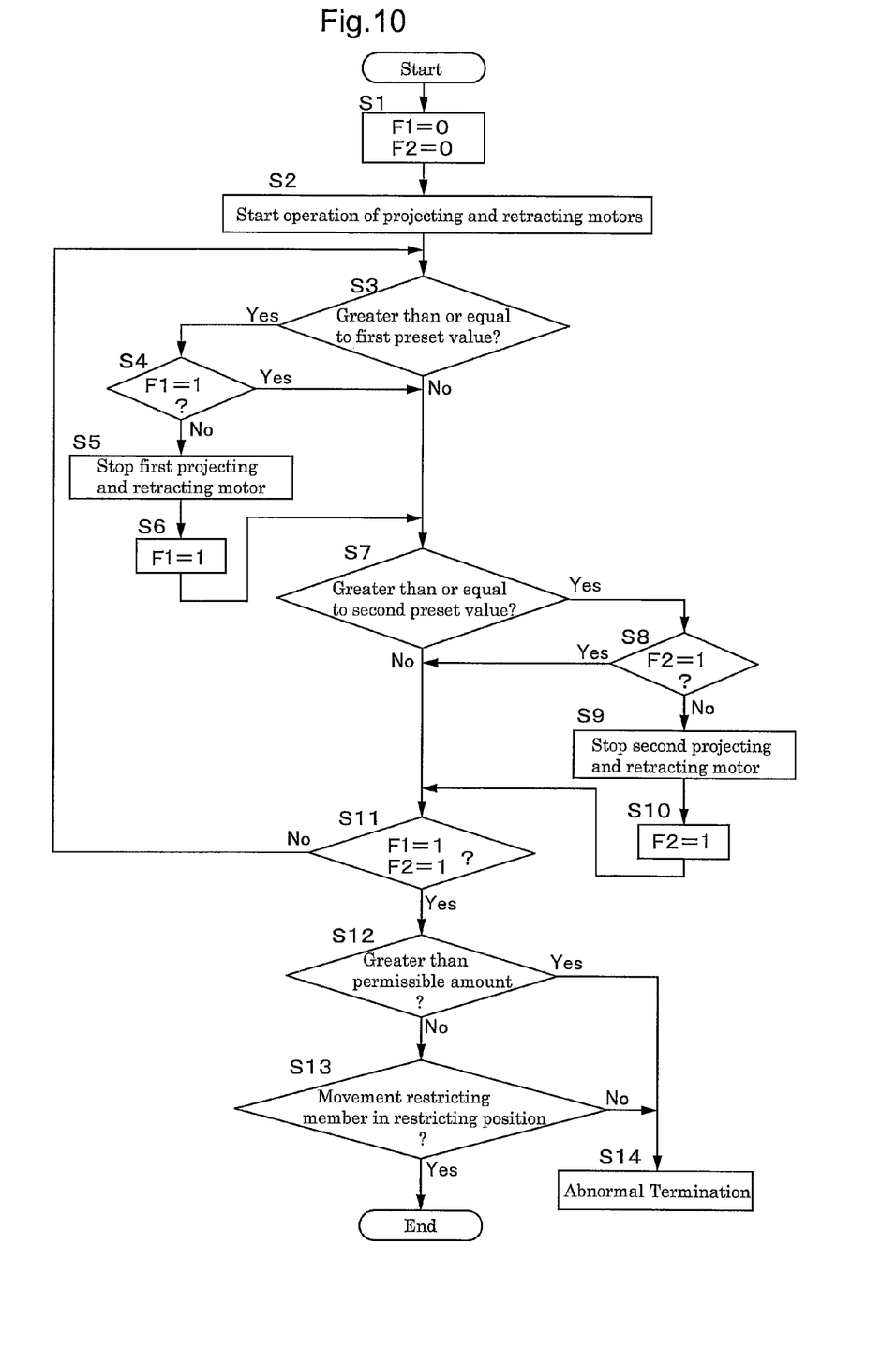
FIG. 10 is a flow chart for when the article holders are projected.

First, as shown at Step S1 in FIG. 10, the transfer controller 41c initializes the control status flags (F1, F2) of the pair of projecting and retracting motors 33 and starts the operations of the projecting and retracting motors 33 (S2). The transfer controller 41c causes the operation of the first projecting and retracting motor 33a to be stopped (S3-S6) when a torque that is greater than or equal to the first preset value occurs in the first projecting and retracting motor 33a due to the article 1 coming into contact with the positioning contact member 14 in the transfer target location E while the first article holder 27a is being projected toward the projected position by the operation of the first projecting and retracting motor 33a. Similarly, the transfer controller 41c causes the operation of the second projecting and retracting motor 33b to be stopped (S7-S10) when a torque that is greater than or equal to the second preset value occurs in the second projecting and retracting motor 33b due to the article 1 coming into contact with the positioning contact member 14 in the transfer target location E while the second article holder 27b is being projected toward the projected position by the operation of the second projecting and retracting motor 33b. In other words, the transfer controller 41c controls the operations of the pair of projecting and retracting motors 33 based on the first preset value and the second preset value.

Figure 9:
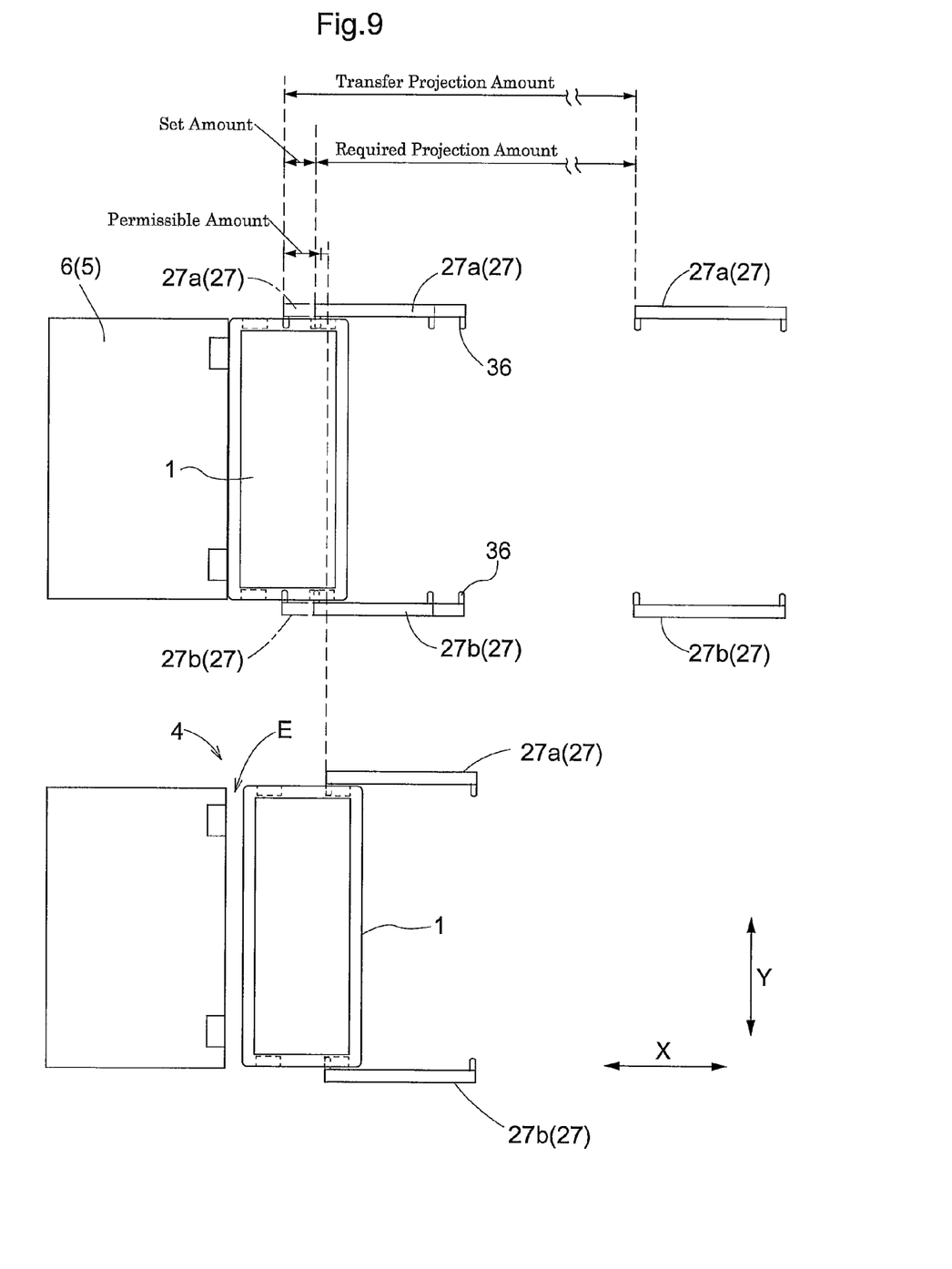
FIG. 9 shows extending and retracting amounts of the article holders.

In addition, as show in FIG. 9, the transfer controller 41c stores, in advance, the amount of projection (transfer projection amount) of the pair of article holders 27 for transfer operation from the reference position to the projected position, and the amount of projection (required projection amount) of the pair of article holders 27 from the reference position that is required to transfer the article 1 to the transfer target location E. The transfer projection amount is set to be greater than the required projection amount by a set amount. A permissible amount which is greater than the set amount is also stored in advance in the transfer controller 41c.

Now, we consider the case where the pair of article holders 27 are projected from the reference position to the projected position in order to transfer the article 1 to the transfer target location E. As shown in the upper portion of FIG. 9, when the pair of article holders 27 are projected by the required projection amount from the reference position, which occurs before the pair of article holders 27 reach the projected position, the article 1 comes into contact with the positioning contact member 14 as shown in FIG. 4C and the operations of the pair of projecting and retracting motors 33 are stopped as described above with reference to FIG. 10d.

During this operation, the transfer controller 41c is capable of determining that the article 1 has not been transferred properly to the transfer target location E if the article 1 comes into contact with any foreign object which is not the positioning contact member 14. We consider the case where torque that is greater than or equal to the present value occurs in each of the pair of projecting and retracting motors 33 before the article 1 reaches the transfer target location E due to, for example, contact with a foreign object as shown in the lower portion of FIG. 9, and where the projecting of the pair of article holders 27 is stopped at the projection amount less than the required projection amount. As shown in the lower portion of FIG. 9, the amount of projection of the pair of article holders 27 from the reference position is less than the required projection amount. In addition, the difference between the amount of projection of the pair of article holders 27 from the reference position and the transfer projection amount is greater than the permissible amount.

In one embodiment, the transfer controller 41c may be configured to determine that the article 1 has not been properly transferred to the transfer target location E if the amount of projection from the reference position is less than the required projection amount and the difference between the amount of projection and the transfer projection amount is greater than the permissible amount. It is preferable that the permissible amount is set to be greater than the set amount. By setting the permissible amount to be greater than the set amount, the transfer controller 41c can be prevented from determining that the article 1 has not been transferred properly to the transfer target location E based on a minute error of, for example, about 1 mm.

In the present embodiment, as shown in the flow chart in FIG. 10, the transfer controller 41c is configured to determine that the article 1 has not been transferred properly to the transfer target location E if either the difference between the amount of projection of the first article holder 27a from the reference position and the transfer projection amount or the difference between the amount of projection of the second article holder 27b from the reference position and the transfer projection amount is greater than the permissible amount when the operations of the pair of projecting and retracting motors 33 are stopped, and is configured to perform an abnormal termination to stop the operation of the article transfer device (S12, S14). In addition, the transfer controller 41c is configured to determine that the article 1 has not been transferred properly to the transfer target location E if the movement restricting member 15 is not in the restricting position when the operations of the pair of projecting and retracting motors 33 are stopped, and is configured to perform an abnormal termination to control the operation of the article transfer device (S13, S14)

The article transfer device 25 is configured to cause the two article holders 27 to be projected and retracted individually by respective projecting and retracting motors 33 and to stop the operations of the pair of projecting and retracting motors 33 when the article 1 comes into contact with the positioning contact members 14 and torque that is greater than the present value occurs in the pair of projecting and retracting motors 33. With the article transfer device 25 thus configured, the structure of the article transfer device 25 is simplified while providing the article transfer device 25 with an ability to transfer an article to the transfer target location E so that the article 1 is pressed against the positioning contact members 14.

Alternative Embodiments (1) In the embodiment described above, an example is described in which the transfer controller is configured to determine that the article 1 has not been transferred properly to the transfer target location E based on the difference between the amount of projection of the article holders 27 from the reference position and the transfer projection amount as well as the permissible amount. However, the transfer controller may be configured not to make such determination. In addition, the transfer controller may be configured to determine that the article 1 has not been transferred properly to the transfer target location E if the movement restricting member 15 is not in the restricting position when the article 1 is transferred to the transfer target location E.

(2) In the embodiment described above, an example is described in which the article transfer device 25 is provided with the restricting member operating member 30 which moves the movement restricting member 15 from the restricting position to the retracted position. However, the restricting member operating member 30 may be provided to the storage sections 4. In addition, an example is described in the embodiment described above in which the movement restricting member 15 is moved to the retracted position by the restricting member operating member 30 only when transferring an article 1 from the transfer target location E onto the article transfer device 25. However, the movement restricting member 15 may be moved to the retracted position by the restricting member operating member 30 also when transferring the article 1 from a location on the article transfer device 25 to the transfer target location E. In addition, the movement restricting member 15 and/or the restricting member operating member 30 may not need to be provided.

(3) In the embodiment described above, an example is described in which the engaged portions 37 are provided in the lateral side faces of the article 1 and in which the engaging claw 36 which engages the engaged portion 37 of the article 1 from outer side in the lateral direction Y is provided to each of the two article holders 27. However, it is also preferable to provide the engaged portions 37 in lateral ends in the front face of the article 1 and to have engaging claws 36 provided to respective article holders 27 such that the engaging claws 36 engage the engaged portions 37 of the article 1 from above or below. In addition, in the embodiment described above, an example is described in which engaging claws 36 are provided to respective article holders 27 and in which an article 1 is transferred by projecting and retracting the pair of article holders 27 with the engaging claws 36 engaging the engaged portions 37 of the article 1. However, an article 1 may be transferred by projecting and retracting the pair of article holders 27 with the pair of article holders 27 clamping and holding both ends of the article 1 in the lateral direction Y.

The invention claimed is:
1. An article transfer device for transferring an article to a transfer target location, the article transfer device comprising:
a pair of article holders which can be moved along a projecting and retracting direction between a reference position and a projected position in which the pair of article holders are projected toward the transfer target location wherein the pair of article holders are configured to be projected toward the projected position to transfer an article to the transfer target location with the pair of article holders holding both ends of the article in a lateral direction which is defined to be a direction that perpendicularly intersects the projecting and retracting direction in plain view in which the article transfer device is seen from above;
a pair of projecting and retracting motors which consist of a first projecting and retracting motor for projecting and retracting a first article holder of the pair of article holders, and a second projecting and retracting motor for projecting and retracting a second article holder of the pair of article holders;
a transfer controller which controls operations of the pair of projecting and retracting motors;
wherein the transfer controller is configured to control operations of the pair of projecting and retracting motors to stop operation of the first projecting and retracting motor when torque that is greater than or equal to a first preset value occurs in the first projecting and retracting motor due to the article coming into contact with a positioning contact member provided in association with the transfer target location when the first article holder is being projected toward the projected position by operation of the first projecting and retracting motor, and to stop operation of the second projecting and retracting motor when torque that is greater than or equal to a second preset value occurs in the second projecting and retracting motor due to the article coming into contact with the positioning contact member when the second article holder is being projected toward the projected position by operation of the second projecting and retracting motor.

2. The article transfer device as defined in claim 1, wherein
a transfer projection amount for the pair of article holders from the reference position to the projected position is set to be an amount of projection that is greater by a set amount than a required projection amount from the reference position that is required to move the article to the transfer target location, and
wherein the transfer controller is configured to determine that the article has not been transferred properly to the transfer target location if either
a difference between the amount of projection of the first article holder from the reference position and the transfer projection amount when operation of the first projecting and retracting motor is stopped because torque that is greater than or equal to the first preset value has occurred,
or
a difference between the amount of projection of the second article holder from the reference position and the transfer projection amount when operation of the second projecting and retracting motor is stopped because torque that is greater than or equal to the second preset value has occurred,
is greater than a permissible amount that is greater than the set amount.

3. The article transfer device as defined in claim 2, further comprising:
a movement restricting member whose position can be changed between a retracted position in which the movement restricting member is retracted from a travel path of the article when the article is being transferred to the transfer target location and a restricting position in which the movement restricting member is projected into the travel path at a location closer toward a retracting side, along the projecting and retracting direction, with respect to the article in the transfer target location in order to restrict movement of the article in the transfer target location toward the retracting side; and
a restricting position detecting device for detecting a position of the movement restricting member;
wherein the transfer controller is configured to determine, based on detected information from the restricting position detecting device, that the article has not been transferred properly to the transfer target location if the movement restricting member is not in the restricting position when operation of the first projecting and retracting motor is stopped because torque that is greater than or equal to the first preset value has occurred and operation of the second projecting and retracting motor is stopped because torque that is greater than or equal to the second preset value has occurred.

4. The article transfer device as defined in claim 2, wherein the pair of article holders include engaging claws which engage respective sides of the article laterally inwardly toward the respective sides of the article.

5. The article transfer device as defined in claim 3, wherein the pair of article holders include engaging claws which engage respective sides of the article laterally inwardly toward the respective sides of the article.

6. The article transfer device as defined in claim 3, further comprising:
a restricting member operating member which can be moved along the projecting and retracting direction and which is configured to move the movement restricting member from the restricting position to the retracted position when the restricting member operating member is projected.

7. The article transfer device as defined in claim 6, wherein the pair of article holders include engaging claws which engage respective sides of the article laterally inwardly toward the respective sides of the article.

8. The article transfer device as defined in claim 1, further comprising:
a movement restricting member whose position can be changed between a retracted position in which the movement restricting member is retracted from a travel path of the article when the article is being transferred to the transfer target location and a restricting position in which the movement restricting member is projected into the travel path at a location closer toward a retracting side, along the projecting and retracting direction, with respect to the article in the transfer target location in order to restrict movement of the article in the transfer target location toward the retracting side; and
a restricting position detecting device for detecting a position of the movement restricting member;
wherein the transfer controller is configured to determine, based on detected information from the restricting position detecting device, that the article has not been transferred properly to the transfer target location if the movement restricting member is not in the restricting position when operation of the first projecting and retracting motor is stopped because torque that is greater than or equal to the first preset value has occurred and operation of the second projecting and retracting motor is stopped because torque that is greater than or equal to the second preset value has occurred.

9. The article transfer device as defined in claim 8, wherein the pair of article holders include engaging claws which engage respective sides of the article laterally inwardly toward the respective sides of the article.

10. The article transfer device as defined in claim 8, further comprising:
a restricting member operating member which can be moved along the projecting and retracting direction and which is configured to move the movement restricting member from the restricting position to the retracted position when the restricting member operating member is projected.

11. The article transfer device as defined in claim 10, wherein
the pair of article holders include engaging claws which engage respective sides of the article laterally inwardly toward the respective sides of the article.

12. The article transfer device as defined in claim 1, wherein
the pair of article holders include engaging claws which engage respective sides of the article laterally inwardly toward the respective sides of the article.

* * * * *